J. T. PICKERING.
DISK WHEEL FOR AUTOMOBILES.
APPLICATION FILED FEB. 14, 1921.
1,393,729.  Patented Oct. 11, 1921.
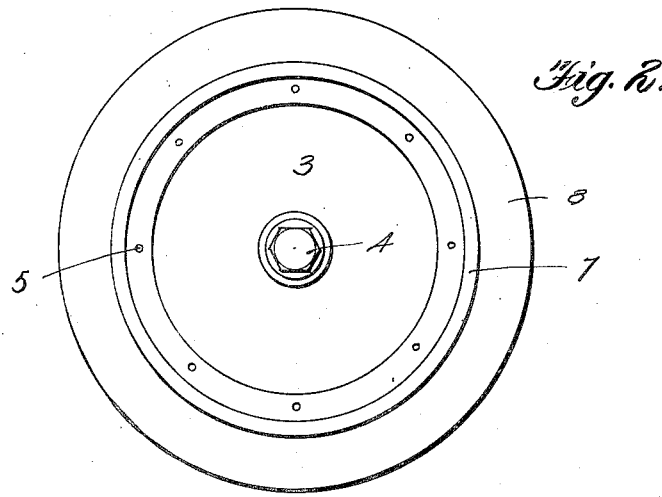
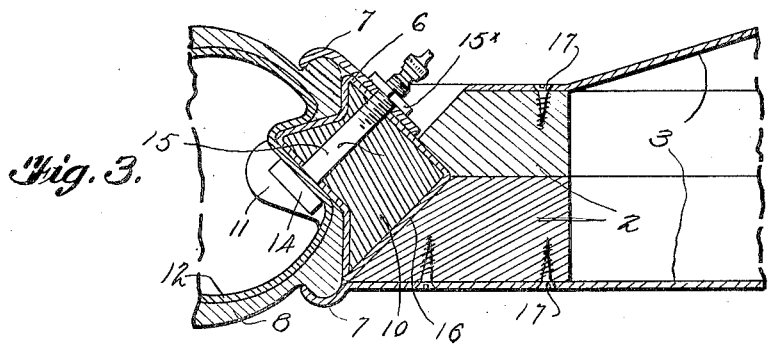
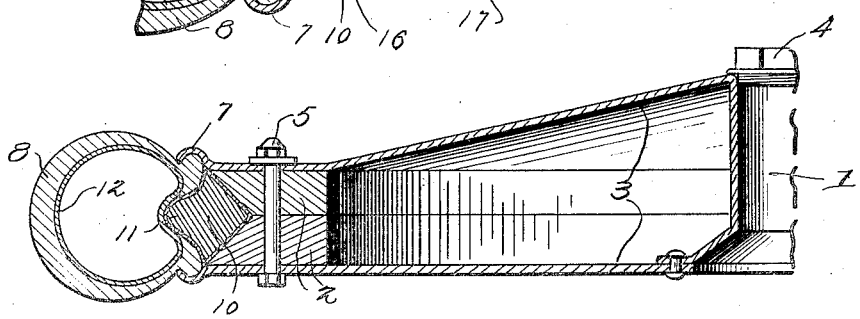
Inventor
J. T. Pickering.
By Jno Lurie
Attorney

UNITED STATES PATENT OFFICE.

JOSEPH THOMAS PICKERING, OF NEW BRIGHTON, ENGLAND.

DISK WHEEL FOR AUTOMOBILES.

1,393,729.   Specification of Letters Patent.   Patented Oct. 11, 1921.

Application filed February 14, 1921. Serial No. 444,983.

*To all whom it may concern:*

Be it known that I, JOSEPH THOMAS PICKERING, a subject of the King of England, and residing at New Brighton, in the county of Chester, England, have invented Improvements in Disk Wheels for Automobiles, (for which I have filed an application in England, No. 3631, Feb. 9, 1920,) of which the following is a specification.

This invention has reference to wheels for self propelled and like vehicles, in which the connection between the hub portion and the felly or rim consists of thin metal disks.

The felly of the wheel will preferably be of wood or the like, and is held between the outer portions of the disks of the wheel, the edges of which project beyond the felly, and are turned inward to form the holding-in flanges of the wheel for the tire or tire cover; and within these parts is a V-shaped groove or recess in the periphery of the felly, and having upon it at the center, in the general plane of the ring, an outwardly projecting rib with a rounded edge, which, when the ring is fitted in the wheel, will be of greater diameter than the extreme diameter of the disks. Between the base of the rib of the ring, and the flanges of the disks, the beads of the tire cover will lie, and the rib keeps and holds the beads in position in the flanges.

The V-shaped ring may be made of canvas and rubber, either in laminæ or disintegrated form, or any compound comprising rubber or other composition or substance, which as a whole in the completed article should be slightly compressible or soft.

When the tire is in position on the wheel, the inner tube would lie over the annular rib of the V-ring; and in the case of the tire being punctured and collapsing, this rib will hold the tire off the flanges of the disks when running on the road, and so protect it against injury.

The invention is shown in the accompanying drawings, in which Figure 1 is a vertical section of the wheel, Fig. 2 a side view, and Fig. 3 a cross section showing parts of the wheel in detail to an enlarged scale.

Referring now to the drawings, 1 is the hub of the wheel, 2 is the felly, and 3 the two metal disks extending between, and connecting together, the hub and the felly.

In the case shown, the wheel is of the divisible kind, and the felly is made in two halves, and the inner disk of the wheel is secured to the hub; and the central part of the other disk fits over the end of the hub as shown, and is held in position by the screwed cap nut 4; while at the periphery of the wheel, the two parts of the felly 2 and the disks 3 are held together by through bolts 5, and cap nuts 6.

The outer edges of the disks 3 as shown project beyond the felly 2, and are turned inward at 7, to form the flanges to engage the beads of the edges of the tire cover 8.

10 is a V-shaped ring which lies in a corresponding V-shaped groove in the outer edge of the felly 2, and 11 is the outwardly projecting rounded rib on the center of the ring 10 which serves the purposes hereinabove described.

By this construction, when it is desired to remove the tire and replace it, the bolts and nuts 5, 6, are undone, and the outer disk 3 with its half felly can be withdrawn bodily away; and then after the tire is in position the outer disk 3 is placed on the side of the other so that the bolt holes over the bolts 5 register; and then by screwing on the nuts 6, the two parts are drawn up together, and the edges of the tire cover are pressed into position in the spaces or grooves between the disk flanges 7, and the rib 11 of the V-ring 10.

Referring to the detail shown in Fig. 3, this illustrates the inflation valve tube, which is connected with the inner tube 12 of the tire; and where this tube comes, the inwardly projecting ledge or rim 11 is partly cut away, and the head 14 of the tube 15 lies in this gap on the inside of the ring as shown. At the point where the tube 15 comes, the outer disk 3 is slit radially, and also circularly at a point within the flange 7; and this slit part is bent inward as shown in Fig. 3 to the angle of the V-ring 10, and the nut 15× of the valve tube is screwed on the tube up to this part of the disk. The wood or like felly at this point is cut away as shown.

In this detail the ring 10 is shown inclosed within an outer wrapping 16 of any suitable material.

The felly portion 2 may be secured to the outer portions of the disks 3 by screws 17 as shown in Fig. 3.

In cases where the flanges or edges of the disks 3 are not inturned, and of the kind adapted to mechanically hook the beads of the tire, they will be made of a shape suitable to the edges of the tire cover used, which fit in them.

The hub in the case of a detachable wheel, may be a shell hub, as shown in the drawing, adapted to be fitted over the hub portion carried by the axle, such as are used in connection with detachable wheels of different kinds.

If desired in some cases a metal rim or projection may be formed on or attached to the inside of the outer disk (or the inner, or both) which comes on the inner edge of the felly, so as to form a direct support from the disks on the inside; and also in the case of the felly being of wood, tubular distance pieces may be provided through the wood fellies, through which the fastening bolts would pass, so that when the bolts were drawn up tight, the two adjacent ends of the tubes would come in contact with each other.

In the case shown in the drawings, the two parts of the divisible wheel are held together by bolts 5 and nuts 6; but in addition to these, there may be used a few relatively long bolts and nuts, having ordinary nuts, which would serve to draw the two parts of the wheel toward one another when replacing the outer part, after having been opened, and after this the cap nuts 6 are fitted and screwed over the holding bolts.

What is claimed is:—

1. A disk wheel comprising a hub portion, an inner disk secured thereto, an outer disk, a hub cap adapted to secure the outer disk to the hub portion, a felly formed in annular halves, one half secured to each disk and adapted to fit between the disks when in assembled relation, the outer peripheral portion of the disks extending beyond the felly and formed into a clencher bead adapted to receive a tire, and a rib carried by the felly and adapted to project beyond the peripheral line of the disks.

2. A disk wheel comprising a hub member, an inner disk and an outer disk secured to the hub member, a felly secured between the disks, the outer peripheral portion of the disks extending beyond the felly and formed to receive a tire, the outer periphery of the felly being formed with a groove, and an annular member mounted therein and projecting beyond the periphery of the disks.

3. A disk wheel comprising a hub member, a pair of disks secured thereto, a felly secured between the disks and formed with a groove in the periphery thereof, the disks projecting beyond the periphery of the felly and formed for receiving a tire, a ring fitting in the groove in the felly and extending beyond the disks adapted to maintain a tire in engagement with the projecting portions of the disks.

4. A disk wheel comprising a hub member, an inner disk secured thereto, an outer disk removably secured to said hub member, a felly secured between the disks and formed with a groove, the disks extending beyond the felly and formed into a tire receiving portion, and a tire retaining ring adapted to fit in the groove in said felly.

5. A disk wheel comprising a hub member, an inner flat disk secured thereto, an outer conical-shaped disk removably secured to said hub member, a felly formed in annular halves, one half secured to each disk and formed to provide a groove in the periphery thereof, means extending through the felly for securing the disks together, the outer edge of the disks extending beyond the felly and formed into a tire receiving portion, and a resilient ring adapted to fit in the groove in the felly and having the periphery projecting beyond the disks.

6. A disk wheel comprising a hub member, an inner disk secured thereto, an outer disk removably secured thereto, a felly formed in annular halves having one-half secured to each disk, means extending through the felly and disks for securing the disks and felly together, the felly being formed with a groove in its periphery, the disks projecting beyond the felly to provide a tire receiving portion, and a resilient ring adapted to fit in the groove in said felly and formed with a rib projecting beyond the periphery of the disks.

7. A disk wheel comprising a hub member, an inner disk secured thereto, an outer disk removably secured thereto, a felly formed in halves having one-half secured to each disk, means extending through the felly and disks for securing said parts together, the felly being formed with a V-shaped groove in its periphery, the disks having tire receiving portions projecting beyond the felly, and a V-shaped ring adapted to fit in said V-shaped groove and projecting beyond the periphery of the disks, said inner disk, felly, and ring being provided with cutaway portions, and a bore adapted to accommodate a valve stem.

In testimony whereof I have signed my name to this specification in the presence of two subscribing witnesses.

JOSEPH THOMAS PICKERING.

Witnesses:
A. M. WATKINS,
E. E. JORDAN.